United States Patent [19]
Pokhis

[11] Patent Number: 5,806,891
[45] Date of Patent: Sep. 15, 1998

[54] SAFETY BELTS FOR MOTOR VEHICLES

[76] Inventor: Naum Pokhis, 1132 S. Doheny Dr., #303, Los Angles, Calif. 90035

[21] Appl. No.: 862,411

[22] Filed: May 23, 1997

[51] Int. Cl.⁶ ..................................................... B60R 22/24
[52] U.S. Cl. .................................. 280/801.1; 297/216.13; 297/483
[58] Field of Search ............................... 280/801.1, 808, 280/801.2, 804; 297/468, 483, 484, 216.1, 216.13

[56] References Cited

U.S. PATENT DOCUMENTS

| | | | |
|---|---|---|---|
| 2,606,727 | 8/1952 | De Haven | 297/216.13 |
| 2,740,642 | 4/1956 | Atwood | 297/216.13 |
| 2,873,122 | 2/1959 | Peras | 297/216.13 |
| 3,762,505 | 10/1973 | Morse | 297/216.1 |
| 3,995,885 | 12/1976 | Plesniarski | 297/483 |
| 4,474,347 | 10/1984 | Hazelsky | 297/216.1 |
| 4,974,876 | 12/1990 | Svensson et al. | 280/801.1 |
| 5,123,673 | 6/1992 | Tame | 297/468 |

*Primary Examiner*—Paul N. Dickson
*Attorney, Agent, or Firm*—Ilya Zborovsky

[57] ABSTRACT

A safety system operable during vehicle accidents comprises a seat located inside a vehicle and having a back, a safety belt assembly operative for holding a user to the seat, and means for connecting the back of the seat to a vehicle roof.

5 Claims, 1 Drawing Sheet

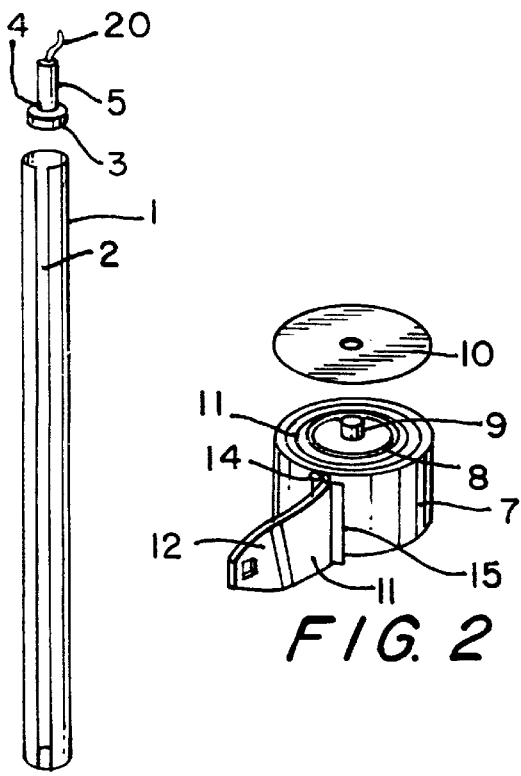
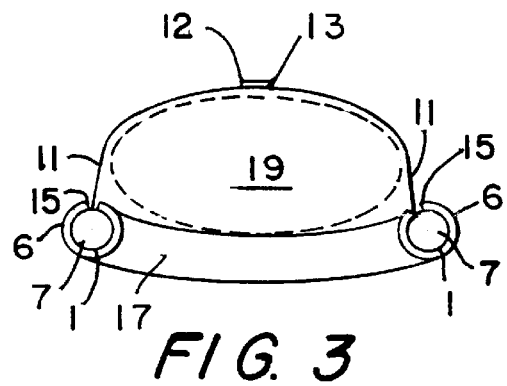
FIG. 1
FIG. 2
FIG. 3
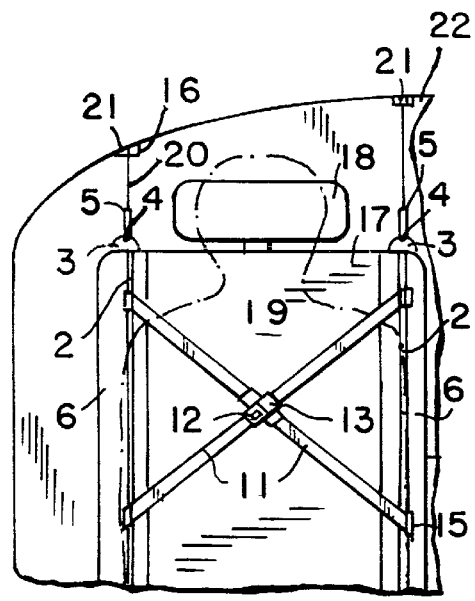
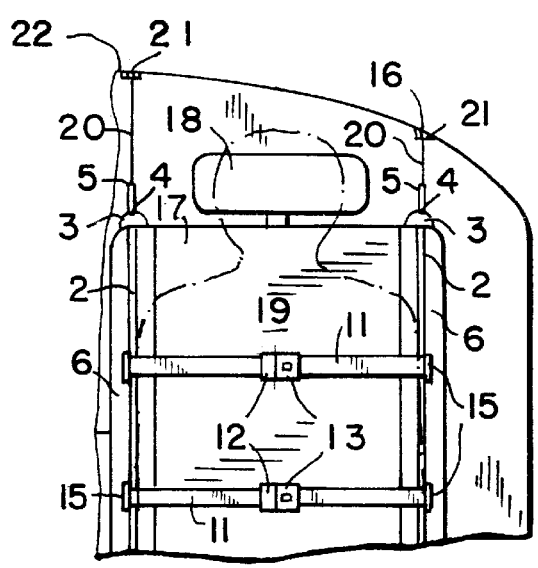
FIG. 4
FIG. 4A

SAFETY BELTS FOR MOTOR VEHICLES

BACKGROUND OF THE INVENTION

This application is a substitute of application Ser. No. 08/288,217 filed Aug. 9, 1994, now abandoned.

The present invention relates generally to safety systems for motor vehicles which protect passengers and drivers for example during accidents to prevent injuries.

Such systems are known in the art. One of such systems includes safety belts which are widely used nowadays. However, during accidents when a vehicle is hit from behind, frequently the driver seat and the passenger seat located beside it are torn from the base together with passengers with frequently very grave consequences. The existing safety belts are connected with their one end to an inner wall of the vehicle body with their another end to a bucket in a base of the seat back. Such fixation holds a user during a front hit, however it does not protect it during accidents when the vehicle is hit from the right side, left side or from the rear. The existing safety belts are also inconvenient for the reason that they are fixed to two immovable points and are diagonally applied on a user's body. Users have different heights, ages and other individual features and therefore it is advisable to apply protection at different levels which are convenient for each particular user. Also, the existing safety belts do not provide sufficient comfort since every time it is necessary to find out how to lock them which is time consuming.

SUMMARY OF THE INVENTION

Accordingly, it is an object of the present invention to provide a safety system which avoids the disadvantages of the prior art.

In keeping with these objects and with others which will become apparent hereinafter, one feature of the present invention resides, briefly stated, in a safety system which has for each seat two slotted pipes provided with outside dampers and each accommodating a coil with a belt extending outwardly through the slots and lockable with one another, the pipes are connected at two opposite sides of each seat, and the dampers are connected with a roof of the car.

When the system is designed in accordance with the present invention it eliminates the disadvantages of the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a slotted pipe with a cover, hinge, damper and part of a cable of an inventive safety system;

FIG. 2 is a view showing a bobbin or a coil with a belt of the inventive safety system;

FIG. 3 is a view showing a horizontal section of a back of a vehicle seat with the safety system of the present invention; and FIG. 4 shows the safety system mounted in a vehicle.

DESCRIPTION OF THE PREFERRED EMBODIMENTS

A safety system in accordance with the present invention has slotted pipes 1 extending vertically and arranged so that two tubes are used for each seat and spaced from one another in a horizontal direction. The tubes are installed inside of side portions of bags of the seats so that a slot 2 and a surface adjoining it is open. Then two bobbins 7 are inserted one above the other into each tube, the tube is closed by an oval cover 3 provided with a hinge on it, a damper 5 formed for example by a spring, hydraulic element, etc., a cable 20 and a coupling nut 21.

Four holders 16 are mounted on a roof 22 under the seat backs 17 and provided with a thread for screwing the coupling nuts 21. The ends of the belts of the bobbins 7 are provided with interlocking elements 12 and 13 which are known per se and formed for example as male and female member. The locking members 12 and 13 are located naturally outside of the slotted pipes 11 at the bottom of the backs of the seats 17. A spring-biased drum 8 is mounted on an axle 9 inside the bobbin 7, and one end of the belt 11 is connected with it, the belt is wound several times around the drum and its opposite end extends outwardly through a rectangular opening 14 and ends in the locking member 12 or 13. The spring-biasing of the drum 8 is known per se and is formed so that during a slow pulling of the belts 11 the drum is easily turnable and it is necessary only to overcome a resistance of a spring inside the drum, while during a sudden pull which occurs during accidents the belts are blocked and a body 19 cannot be separated from the back 7.

The device operates in the following manner: a driver and a passenger sit on their seats, take the left and locking members 12 and 13 which are located at the bottom of the backs of the seats 17 with their hands and lock them around the user's body diagonally as shown in the left part of FIG. 4 or parallel as shown in the right part of FIG. 4. The belts 11 can be locked at a convenient height and positioned, depending on the individual features of a user and a degree of danger, such as speed of driving, driving in unfavorable weather conditions, etc. If a user has to bend when he is strapped by the belts, he can do it by slowly moving so that the belts are pulled out from the bobbins 7. In the event of the accident, however when the car is hit from the front, the user's body 19 will be firmly held by two belts 11 which would transfer the corresponding forces to the slotted pipes 1, and thereby not only the back 17 with the seat mounted below, but also the hinge 4, the damper 5, the cable 20 and the roof 21 of the vehicle will take part in absorbing the strike. The additional participation of the roof 22 in holding the back 17 with the user 19 on the seat prevents injuries and possible death of the user. In contrast, the existing safety belts which have one end connected to the wall of the passenger cannot protect the user during a side hit, since they do not have circumferential encircling of a user as shown in FIG. 3, and also not all vehicles have oval projections 6 on the backs. If the vehicle is hit from the rear with known safety systems, the seat together with the user are removed from its mounting plate forcedly and consequences are very unfortunate.

In the device in accordance with the present invention, the back of the seat 17 is additionally connected with the roof 22. When it is necessary to unlock the belts 11, the user presses a button as known per se in the art, the belts are unlocked and pulled into the interior of the bobbins 7. The bobbins 7 slide along the slotted pipe 1 until they abut against its bottom and occupy a constant position one above the other. This facilitates grasping the locking members 12 and 13 for fast buckling of the belts. If it is necessary to move the seat forwardly or rearwardly, then due to hinges 4, and angle between the cables 20 and the roof 22 is changed, but the connection is still operative.

It will be understood that each of the elements described above, or two or more together, may also find a useful application in other types of constructions differing from the types described above.

While the invention has been illustrated and described as embodied in safety belts for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A safety system operable during vehicle accidents, comprising a seat located inside a vehicle and having a back; a safety belt assembly operative for holding a user to said seat; and two slotted pipes arranged vertically at two sides of said seat and having substantially vertical slots, said safety belt assembly has two bobbins each arranged in a respective one of said pipes and each having belts, said bobbins being slideable along said Pipes downwardly toward a lower end of each of said pipes and are located at said lower end in an inoperative position and means for connecting said back of said seat to a vehicle roof said connecting means being provided with flexible elements with a dampening affect so that said seat can move forwardly and rearwardly while said back remains connected to the roof.

2. A safety system as defined in claim 1, wherein said seat has two sides provided with oval projections extending from said sides, said safety belt assembly having belts for surrounding a user in an area between said oval projections.

3. A safety system as defined in claim 1, wherein said safety belt assembly is formed so that during a slow pulling of a belt said belt is easy to pull out while when said belt is abruptly pulled it is blocked.

4. A safety system as defined in claim 1, and further comprising another such belt assembly, and another such seat, each of said belt assemblies being provided for each of said seats and having belts arranged so that they can be strapped on a user in a position selected from the group consisting of diagonally or parallel.

5. A safety system as defined in claim 1, wherein said connecting means include connecting elements mounted on the roof and coupling nuts connected with said back and releasably screwable with said connecting elements so that said coupling nuts can be disconnected.

* * * * *